United States Patent [19]

Tsumura

[11] Patent Number: 4,868,852
[45] Date of Patent: Sep. 19, 1989

[54] FACSIMILE MACHINE HAVING AN OUTPUT LEVEL ADJUSTING FUNCTION

[75] Inventor: Naoki Tsumura, Kawasaki, Japan
[73] Assignee: Ricoh Company, Ltd., Tokyo, Japan
[21] Appl. No.: 146,481
[22] Filed: Jan. 21, 1988
[30] Foreign Application Priority Data Jan. 21, 1987 [JP] Japan .................................. 62-12843

[51] Int. Cl.$^4$ .............................................. H04B 1/04
[52] U.S. Cl. ...................................... 375/59; 358/469; 332/117
[58] Field of Search ............... 358/256, 257, 280, 286, 358/281; 379/100; 455/116; 332/17; 375/59

[56] References Cited

U.S. PATENT DOCUMENTS 3,735,034 5/1973 Richeson, Jr. ....................... 358/281
3,889,057 6/1975 Perreault et al. .................... 358/281
4,346,410 8/1982 Maeno ................................. 358/281

Primary Examiner—Robert L. Griffin
Assistant Examiner—Marianne Huseman
Attorney, Agent, or Firm—Oblon, Spivak, McClelland, Maier & Neustadt

[57] ABSTRACT

A facsimile machine includes a MODEM, an attenuator, an NCU and a controller. A signal from the MODEM is adjusted in level by the attenuator under the control of the controller and then output to a transmission line through the NCU. In this case, the adjustment of the level of the signal to be transmitted is carried out in accordance with a predetermined characteristic, such as frequency, of the signal to be transmitted. Also provided is a push phone having a DTMF signal generating circuit and a DTMF signal is also adjusted in level before being output to the transmission line in a manner similar to the signal from the MODEM.

8 Claims, 4 Drawing Sheets

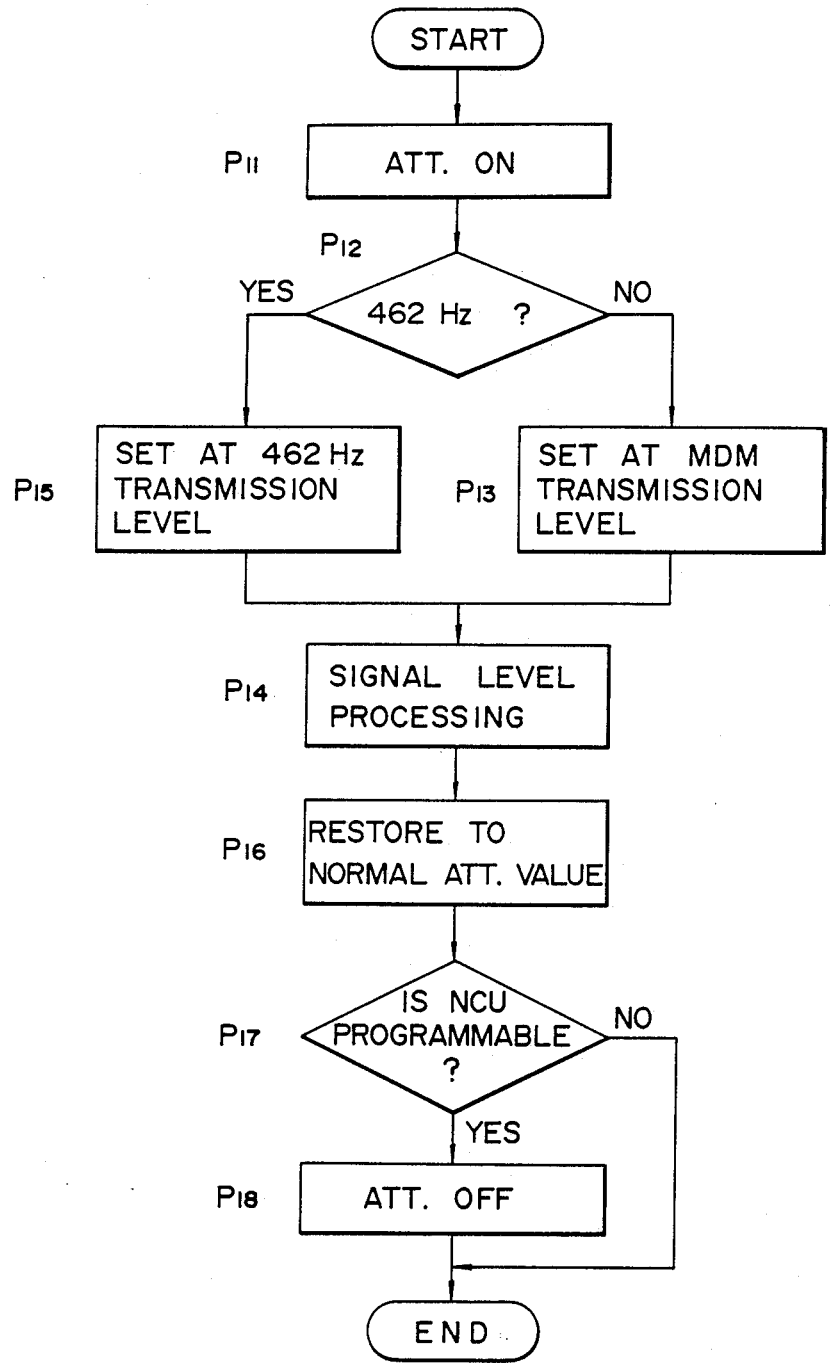

FACSIMILE MACHINE HAVING AN OUTPUT LEVEL ADJUSTING FUNCTION

BACKGROUND OF THE INVENTION

1. Field of the Invention

This invention generally relates to a facsimile machine, and, in particular, to a facsimile machine having a capability of adjusting the level of a signal to be transmitted.

2. Description of the Prior Art

In general, a signal to be transmitted to a facsimile receiver from a facsimile transmitter is desired to have a constant transmission level irrespective of the frequency of a signal to be transmitted. In addition, due to the recent rapid prevalence of facsimile machines over the world, transmission is often made not only to a facsimile receiver in one country but also to a facsimile machine in a foreign country. However, since the regulated value of a signal transmission level generally differs from country to country, a facsimile machine is required to absorb such differences in the signal transmission level so as to allow to carry out transmission of a signal smoothly without regard to the location of the facsimile receiver.

Signals to be supplied to a network from a facsimile machine include an image signal and a control signal, which are output through a MODEM of the facsimile machine, and also a DTMF (Dual Tone Multi-Frequency) signal, which is output from a DTMF signal generating circuit when a push button of a push phone has been depressed. Such MODEM signals (i.e., image signal and control signal) and DTMF signal to be output to a network from a facsimile machine are regulated in their levels in each country or a region of the world. However, there is typically a scatter in the transmission level in each of these signals output from a facsimile machine. That is, (1) Each of these signals has a unique frequency, but there is a slight scatter in the output level of a signal to be output from a MODEM according to frequency; and (2) There is a specific frequency characteristic in each of the circuits between the output terminal of a MODEM and the output terminal of a facsimile machine and between the DTMF signal generating circuit and the output terminal of a facsimile machine.

In addition to a scatter in the transmission level of each of the signals output from a facsimile machine as described above, the regulated value of a transmission level of a signal output to a network from a facsimile machine often differs from country to country. Under the circumstances, in a prior art technique, it is typically so structured that all of the signals output from a facsimile machine are limited to be equal to or lower than a specified level uniformly by a transmission signal level adjusting attenuator in a fixed manner. In such a prior art structure, since all of the signals output from a facsimile machine are regulated to be equal to or less than a specified level uniformly, it is impossible to attenuate the output level in accordance with the frequency of each signal. As a result, there is produced a scatter in the frequency of each signal depending on the circuit characteristic, so that there is a chance that the regulated value is exceeded depending on the frequency and there is also a chance that a sufficient output level is not obtained because the attenuation becomes excessive.

In order to cope with this problem, it is conceivable to provide an attenuator having a differing rate of attenuation depending on frequency so as to make all of the signals fall within a regulated range. In this case, however, it is required to provide a circuit complicated in structure. Besides, when the circuit characteristic of a MODEM or a DTMF signal generating circuit varies for some reason, complicated adjustments for absorbing such variations must be carried out, which tend to push up the cost. In addition, in such a hardware structure, it is necessary to prepare individual adjusting circuits for satisfying the various regulated values for a signal transmission level in various countries, which tend to make the machine complicated in structure and also to push up the cost.

SUMMARY OF THE INVENTION

In accordance with the principle of the present invention, there is provided a facsimile machine which comprises adjusting means disposed between a MODEM/DTMF signal generating circuit and a network for adjusting the output level of a signal to be transmitted in accordance with an output signal. That is, in accordance with the present invention, a signal from a MODEM and a DTMF signal from a push phone are output to an external transmission line or network after adjusting the output level of each of these signals to a predetermined level by level adjusting means which is controlled by controlling means in accordance with an output signal.

It is therefore a primary object of the present invention to obviate the disadvantages of the prior art as described above and to provide an improved facsimile machine.

Another object of the present invention is to provide an improved facsimile machine capable of keeping the output level of each of various output signals substantially at constant.

A further object of the present invention is to provide an improved facsimile machine high in performance, simple in structure and low at cost.

Other objects, advantages and novel features of the present invention will become apparent from the following detailed description of the invention when considered in conjunction with the accompanying drawings.

BRIEF DESCRIPTION OF THE DRAWINGS

FIG. 4 is a flow chart showing the sequence of steps for setting a rate of attenuation of a MODEM signal which may be advantageously used in the structure shown in FIG. 1.

DESCRIPTION OF THE PREFERRED EMBODIMENTS

Figure 1:
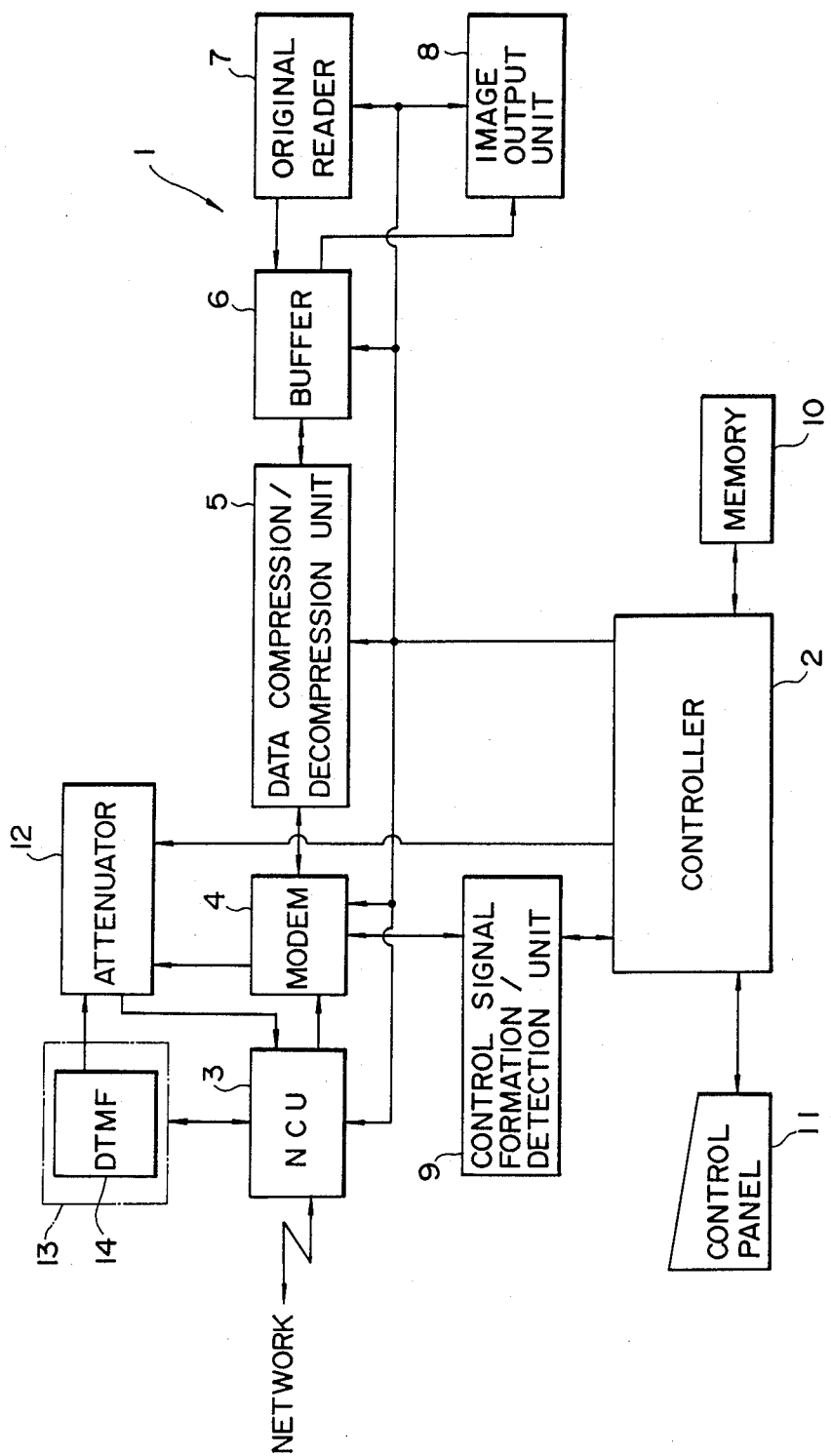
FIG. 1 is block diagram showing the overall structure of a facsimile machine constructed in accordance with one embodiment of the present invention.

Referring now to FIG. 1, there is shown in block form a facsimile machine 1 constructed in accordance with one embodiment of the present invention. As shown, the illustrated facsimile machine 1 includes a controller 2, a net control unit 3, a MODEM 4, a data compression/decompression unit 5, a buffer 6, an original reading unit 7, an image outputting unit 8, a control signal formation/detection unit 9, a memory 10, a control panel 11 and an attenuator 12. The original reading unit 7 optically reads an original set in position in the facsimile machine 1 by scanning and the image data thus read is transferred to the buffer 6 for storing therein temporarily. The image information thus stored in the buffer 6 is read out in accordance with a command from the controller 2 and then it is compressed by coding by the data compression/decompression unit 5. The image information thus compressed by the unit 5 is then modulated by the MODEM 4 and the thus modulated image information is then corrected in transmission level to a regulated value as attenuated by the attenuator 12 serving as a level adjusting means. Finally, the thus corrected image information is output to a network through the net control unit 3.

The net control unit 3 is also connected to a push type telephone 13 which includes a DTMF signal generating circuit 14 in the illustrated embodiment. When a push button of the push phone 13 has been depressed, the DTMF signal generating circuit 14 generates a signal (DTMF signal) having a corresponding low frequency. In the DTMF scheme, in order to provide enhanced transfer speed and stability in placing a call, there are provide six frequencies within a selection signal dedicated band and a combination of any two of these six frequencies can discriminate decimal numbers and five kinds of special codes. With this scheme, a number of digits in the order of 10 may be transferred within one second.

A signal from the phone 13 is input into the attenuator 12 which adjusts the level of an input signal (image signal or DTMF signal) according to the kind thereof based on a command from the controller 2 and then supplies the thus adjusted signal to the net control unit 3, as will be described more in detail later. The controller 2 may, for example, be comprised of a CPU or micro-computer and controls the amount of attenuation depending on the frequency of an input signal into the attenuator 12 in accordance with a program stored inside of the controller 2, and controller 2 also is in charge of various operations of the facsimile machine 1. It is to be noted that the net control unit 3 is so structured to place a call automatically and to receive a call automatically. In general, such an automatic calling and receiving function is called AA-NUC.

On the other hand, the image information received as transmitted from a transmitter through a network is first received by the net control unit 3 and then it is supplied to the MODEM 4 without passing through the attenuator 12. Thus, the signal is demodulated at the MODEM 4 and the demodulated signal is supplied to the data compression/decompression unit 5 where the signal is restored to the original image information which is not compressed. The thus restored image information is then temporarily stored into the buffer 6. The image information stored in the buffer 6 is read out in accordance with a command from the controller 2 and supplied to the image outputting unit 8 where the image information is recorded on a recording medium, such as a sheet of recording paper. Prior to transmission or reception of image information, the control signal formation/detection unit 9 determines a format of a control signal to be exchanged between a transmitter and a receiver and also detects a received control signal. The memory 10 is typically comprised of a non-volatile memory or the like and it stores various information, such as identification information of a facsimile machine which has been recognized as a transmitter and ID during polling communication. The control panel 11 is used for the operator to provide various operational instructions to the facsimile machine 1 and inputting of various instructions, such as those described above, into the memory 10 may be carried out through this control panel 11.

Figure 2:
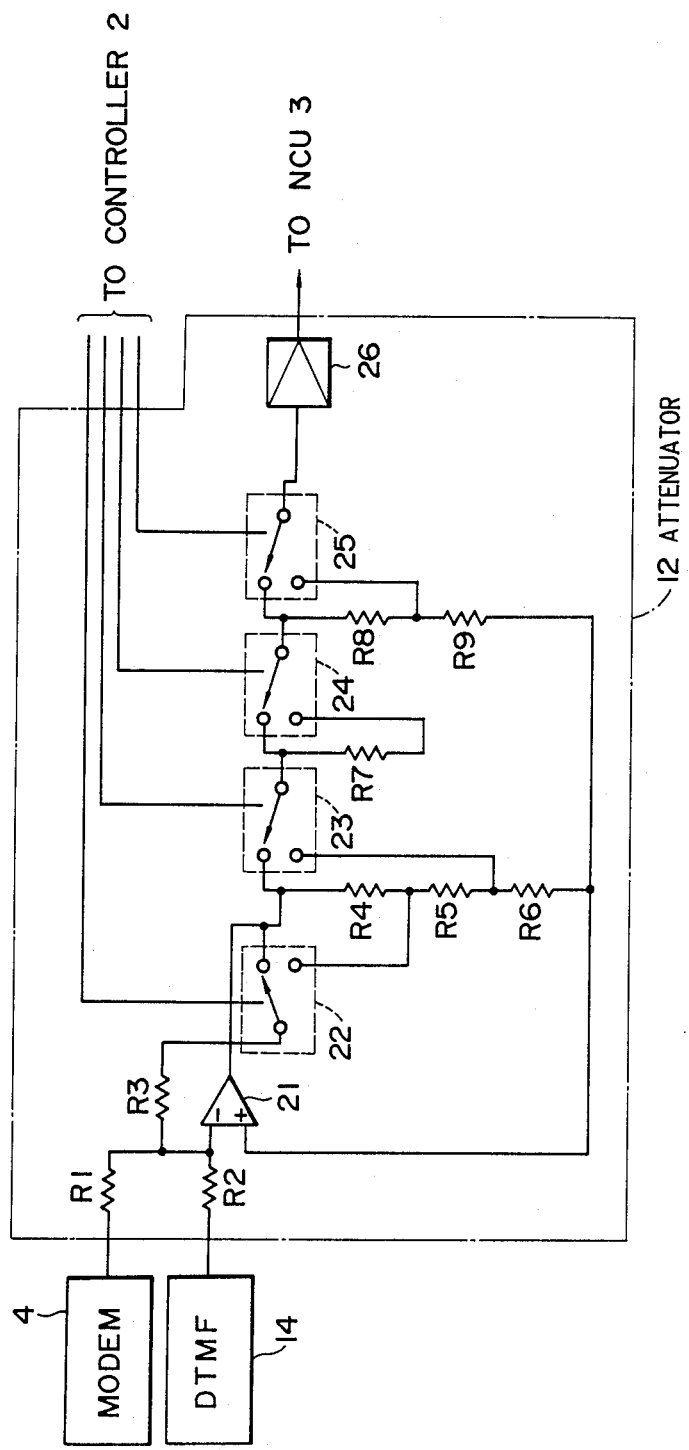
FIG. 2 is a circuit diagram showing an example of the attenuator provided in the structure shown in FIG. 1.

The detailed structure of one example of the attenuator suitable for use in the facsimile machine 1 shown in FIG. 1 is shown in FIG. 2. As shown, the illustrated attenuator 12 includes an operational amplifier 21, a plurality of analog switches 22 through 25, a buffer amplifier 26 and a plurality of resistors R1 through R9. The operational amplifier 21 has a dual function, including a buffer like function to increase an input impedance of the attenuator 12 and an amplifier function for varying the rate of amplification by changing the feedback amount by switching the analog switches 22 through 25. In accordance with a command from the controller 2, the analog switches 22 through 25 switch a connection among the resistors R3 through R9. And, the buffer 26 subjects a signal to buffered amplification and then outputs it to the net control unit 3.

In operation, in the illustrated embodiment, based on an output signal output to a network from the facsimile machine 1, the level of the output signal is adjusted substantially at constant, and this process is implemented by a different program or sequence of steps depending on the kind of the output signal by the controller 2. It is to be noted that in the illustrated embodiment the output signal may be classified between DTMF signal and MODEM signal (including image signal and control signal) and thus there are stored two programs for processing DTMF signal and MODEM signal, as shown in FIGS. 3 and 4, respectively.

Figure 3:
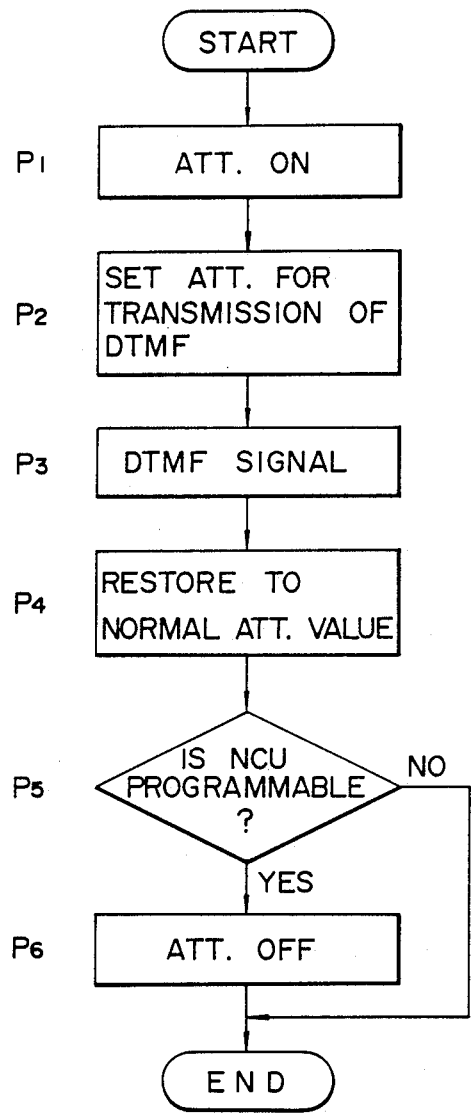
FIG. 3, is a flow chart showing the sequence of steps for setting a rate of attenuation of a DTMF signal which may be advantageously used in the structure shown in FIG. 1.

FIG. 3 is a flow chart showing a program for setting the rate of attenuation of a DTMF signal. This program is executed, for example, at the stage for placing a call to a destination when the push phone 13 is operated to generate a DTMF signal. In the first place, at step P1, the attenuator or simply ATT 12 is turned on, and, then, at step P2, the rate of attenuation of the attenuator 12 is set at a transmission level of a DTMF signal. This transmission level is determined by a particular combination of ON/OFF conditions of the analog switches 22 through 25 and an optimum combination has been previously determined, for example, empirically for each of DTMF signals (frequencies). Then, at step P3, a DTMF signal from the DTMF signal generating circuit 14 is input into the attenuator 12 where the level of the DTMF signal is adjusted to a reference level of a network or transmission line in the network in accordance with a previously determined rate of attenuation for the particular frequency of the DTMF signal. This attenuating operation continues as long as the DTMF signal is being output from the DTMF signal generating circuit 14. Upon completion of outputting of the DTMF signal, i.e., when the push button operation of the push phone 13 has been completed, the attenuator 12 is returned to its normal rate of attenuation at step P4.

Then, at step P6, it is determined whether the net control unit or simply NCU 3 is programmable or permissive. It is to be noted here that the facsimile machine 1 has two modes: programmable mode and permissive mode, each of which may be selected switchingly. The switching between these two modes may be carried out by a bit switch or the like, for example, by a service personnel with ease. In the present specification, the permissive mode refers to a mode which is similar to the conventional mode and in which the transmission level of a signal to be transmitted to a network is always set at a fixed level of 9 dBm, so that the rate of attenuation cannot be altered. On the other hand, the programmable mode is a mode which allows to alter the rate of attenuation freely as described above briefly. Thus, if it has been determined to be programmable at step P5, it proceeds to step P6 to turn the attenuator 12 off, thereby terminating the present routine. On the other hand, if it has been found to be non-programmable, then step P6 is skipped. In this manner, during transmission of a DTMF signal, the rate of attenuation of the attenuator 12 is automatically adjusted to a corresponding optimum value, which has been determined previously, so that the transmission level of a DTMF signal is always adjusted to the reference level.

FIG. 4 is a program showing a program or sequence of steps for setting the rate of attenuation of a MODEM signal in accordance with the principle of the present invention. This program is executed after completion of preparation for carrying out facsimile communication upon completion of calling a destination station by the above-described DTMF signal. In the first place, at step P11, the attenuator 12 is turned on and then it is determined at step P12 whether or not it is a PIS signal having the frequency of 462 Hz. The PIS signal is a signal which is transmitted from the transmitter upon completion of facsimile communication so as to reduce the transmission line holding time period after completion of communication and to prevent the occurrence of unnecessary paper feed at the receiver. Thus, at step P12, it is determined that the communication has not yet been completed if it is not a signal of 462 Hz, and, in this case, it proceeds to step P13 to set the rate of attenuation of the attenuator 12 so as to adjust the level of a signal from the MODEM 4 at a predetermined reference level. This rate of attenuation has been previously set for each frequency of the MODEM signal, so that the ON/OFF status of each of the analog switches 22 through 25 of the attenuator 12 is determined depending on the frequency of a MODEM signal in accordance with a command from the controller 2. Then, it proceeds to step P14 where a signal from the MODEM 4 is input into the attenuator 12, whereby the level of the MODEM signal thus input is adjusted to the reference level of the transmission line using an optimum rate of attenuation for each frequency of the MODEM signal.

On the other hand, if the signal of 462 Hz has been detected at step P12, it proceeds to step P15 where the rate of attenuation of the attenuator 12 is set so as to set the signal of 462 Hz to a predetermined reference level, and, thereafter, it proceeds to step P14 where the level of the signal of 462 Hz is adjusted to the reference level. Upon completion of outputting of the MODEM signal, it proceeds to step P16 where the attenuator 12 is restored to its normal rate of attenuation. Then, it goes through steps P17 and P18 which are similar to step P5 and P6 in the flow chart of FIG. 3.

As described above, in accordance with the present invention, even during transmission of a MODEM signal, the rate of attenuation of the attenuator 12 is automatically altered so that the transmission level of a signal to be transmitted is adjusted to a reference level. As a result, even if the circuit characteristic of a circuit between the MODEM 4 and the network or transmission line varies for some reason, the level of a signal to be transmitted may be suitably adjusted by altering the rate of attenuation of the attenuator 12 and there is obtained a uniform transmission level irrespective of the frequency of a signal to be transmitted. In addition, as different from the prior art, the alteration of the rate of attenuation may be carried out even if the circuit is in operation, so that there is provided an enhanced operability. Moreover, alteration of the rate of attenuation can be carried out by software, so that there is no need to prepare an individual hardware for altering the rate of attenuation for each signal having a different frequency, which contributes to avoid complication in structure and high cost. As a result, even if the present facsimile machine satisfies different regulated values of transmission level of various countries, it is not necessary to provide individualized hardware for each country. Thus, depending on the condition of a network in a particular area, level adjustments can be carried out by fine adjustments at the time of installation of a facsimile machine, and the same hardware can be commonly used for communication with countries or areas having different regulated values of transmission level, which leads to a reduction in cost. Specifically speaking, the same hardware may be used in different countries, for example, U.S.A. and Europe, which have different regulated values of transmission level. In addition, the degree of attention to be paid for a scatter in the level of a transmission signal in a circuit or hardware is relaxed, so that the circuit structure may be simplified, thereby easing adjustment or alteration of level and allowing to shorten a time period for developing a new model.

It is to be noted that the circuit structure of the attenuator 12 should not be limited only to the embodiment described above and any type of circuit structure may be used as long as it is capable of varying the rate of attenuation in a predetermined manner. In addition, in the above-described embodiment, the rate of attenuation by an attenuator has been determined previously for each frequency; however, the present invention should not be limited only to this example and it may also be structured such that a transmission level for each frequency is set in advance and the level of a signal from a MODEM or DTMF signal generating circuit is detected to correct the rate of attenuation of the attenuator so as to adjust the transmission level to a predetermined level.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:
1. A facsimile machine comprising:
first producing means for producing a first signal to be transmitted;
modulating means for modulating said first signal to be transmitted;
memory means for storing a table of adjustment values for each of the frequencies of said first signal;
adjusting means for adjusting a level of said first signal to be transmitted after modulation by said modulating means to one of the prestored adjustment values the level of said first signal before said signal is outputted to a network; and controlling means for controlling an overall operation of said facsimile machine, said controlling means controlling an adjusting operation of said adjusting means in accordance with a predetermined characteristic of said first signal to be transmitted.

2. The machine of claim 1, wherein said predetermined characteristic is a frequency of said signal to be transmitted.

3. The machine of claim 1, further comprising second producing means for producing a second signal to be transmitted which is also processed by said adjusting means under the control of said controlling means in a manner similar to said first signal to be transmitted.

4. The machine of claim 3, wherein said adjusting means includes an attenuator capable of setting one of a plurality of rates of attenuation.

5. The machine of claim 4, wherein said attenuator includes an operational amplifier having a first input terminal coupled to receive said first and second signals, a second input terminal and an output terminal coupled to supply an output signal from said operation amplifier to said network and a feedback loop extending between said second input and output terminals of said operational amplifier, said feedback loop including a plurality of resistors and a plurality of switches which are selectively operated by said controlling means to thereby connect said plurality of switches in said feedback loop selectively.

6. The machine of claim 3, wherein said first producing means includes an original reader for optically reading an original image to produce said first signal and compressing means for compressing said first signal by coding.

7. The machine of claim 3, wherein said second producing means includes a DTMF signal generating circuit.

8. A facsimile machine comprising:
first producing means for producing a first signal to be transmitted;
modulating means for modulating said first signal to be transmitted;
adjusting means for adjusting a level of said first signal to be transmitted after modulation by said modulating means to a predetermined level before being outputted to a network;
controlling means for controlling an overall operation of said facsimile machine, said controlling means controlling an adjusting operation of said adjusting means in accordance with a predetermined characteristic of said first signal to be transmitted; a second producing means for producing a second signal to be transmitted which is also processed by said adjusting means under the control of said controlling means in a manner similar to said first signal; and
wherein said adjusting means comprise an attenuator capable of setting one of a plurality of rates of attenuation wherein said attenuator comprises an operational amplifier having first input terminal coupled to receive said first and second signal;
a second input terminal and output terminal coupled to supply an output signal from said operational amplifier to said network and a feedback loop extending between said second input and output terminals of said operational amplifier; said feedback loop including a plurality of resistors and a plurality of switches which are selectively operated by said controlling means to thereby connect said plurality of switches in said feedback loop selectively.

* * * * *